United States Patent
Stiesdal

(10) Patent No.: US 9,470,204 B2
(45) Date of Patent: Oct. 18, 2016

(54) METHOD FOR REPLACING A PERMANENT MAGNET OF A WIND TURBINE GENERATOR

(71) Applicant: Siemens Aktiengesellschaft, Munich (DE)

(72) Inventor: Henrik Stiesdal, Odense C (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 25 days.

(21) Appl. No.: 14/063,352

(22) Filed: Oct. 25, 2013

(65) Prior Publication Data

US 2014/0050555 A1    Feb. 20, 2014

Related U.S. Application Data

(62) Division of application No. 12/494,586, filed on Jun. 30, 2009, now abandoned.

(30) Foreign Application Priority Data

Jul. 4, 2008 (EP) ..................................... 08012114

(51) Int. Cl.
| | | |
|---|---|---|
| *F03D 1/00* | (2006.01) | |
| *B65D 85/68* | (2006.01) | |
| *B65B 69/00* | (2006.01) | |
| *B65B 25/00* | (2006.01) | |

(52) U.S. Cl.
CPC ............... *F03D 1/005* (2013.01); *B65D 85/68* (2013.01); *F03D 1/003* (2013.01); *B65B 25/00* (2013.01); *B65B 69/00* (2013.01); *B65D 2585/6875* (2013.01); *Y10T 29/49318* (2015.01)

(58) Field of Classification Search
CPC .......... B65D 85/68; B65D 2585/6875; B65D 88/02; B65D 67/04; B65D 25/02; B65D 61/18; B65D 69/00; B65D 2585/6807; F03D 1/005; F03D 1/003; B65G 39/14; B43M 99/004; H01L 2224/95144; H05K 13/021; H05K 13/0084; B65B 25/00
See application file for complete search history.

(56) References Cited

U.S. PATENT DOCUMENTS

| | | | | | |
|---|---|---|---|---|---|
| 2,519,895 | A | * | 8/1950 | Edwards | ................ H02K 21/46 310/156.79 |
| 2,865,499 | A | * | 12/1958 | Brogren | ........................ 206/386 |
| 2,865,500 | A | * | 12/1958 | Parsons et al. | ............... 206/386 |
| 2,954,140 | A | * | 9/1960 | Sutherland et al. | ............ 217/53 |
| 3,510,773 | A | * | 5/1970 | Dinlocker | ................ G01R 5/16 324/146 |
| 4,308,591 | A | * | 12/1981 | George | ................ G11C 19/085 365/15 |

(Continued)

FOREIGN PATENT DOCUMENTS

JP        2000166191 A  *  6/2000

*Primary Examiner* — Glenn Myers

(57) ABSTRACT

A method is provided for replacing a permanent magnet of a generator of a wind turbine from a first position to a second position. A container is provided having a shell and an opening through the shell. The opening defines an open space for storing the permanent magnet. The open space is surrounded by the shell, and the shell having a thickness that provides that the permanent magnet does not come close enough to other magnetic material to exert significant force on it. The method involves placing the permanent magnet from the first position into the container, transporting the container with the permanent magnet to the second position, removing the permanent magnet from the container, and placing the permanent magnet in the second position.

8 Claims, 2 Drawing Sheets

(56) References Cited

U.S. PATENT DOCUMENTS

| | | | | | |
|---|---|---|---|---|---|
| 4,377,854 | A | * | 3/1983 | Braun | G11C 19/085 365/2 |
| 4,726,746 | A | * | 2/1988 | Takada | F02M 37/08 417/366 |
| 4,982,556 | A | * | 1/1991 | Tisma | B65B 35/205 198/477.1 |
| 6,213,707 | B1 | * | 4/2001 | Liehs | B65B 69/00 414/405 |
| 6,650,122 | B2 | * | 11/2003 | Sullivan et al. | 324/545 |
| 6,983,529 | B2 | * | 1/2006 | Ortt | H02K 1/17 264/272.19 |
| 7,073,310 | B1 | * | 7/2006 | Long | B65B 25/145 53/117 |
| 2002/0144545 | A1 | * | 10/2002 | Cesmat | B01D 21/0009 73/152.18 |
| 2003/0120387 | A1 | * | 6/2003 | Sherwin | B25J 15/0052 700/245 |
| 2006/0291146 | A1 | * | 12/2006 | Madsen | A45C 11/00 361/600 |
| 2008/0229571 | A1 | * | 9/2008 | Acosta | H02K 5/02 29/607 |
| 2009/0120830 | A1 | * | 5/2009 | Livingston | B65D 57/00 206/523 |
| 2012/0312707 | A1 | * | 12/2012 | Baten | F01D 25/285 206/319 |

* cited by examiner

METHOD FOR REPLACING A PERMANENT MAGNET OF A WIND TURBINE GENERATOR

CROSS REFERENCE TO RELATED APPLICATIONS

This application is a divisional application claiming benefit of the U.S. patent application filed on Jun. 30, 2009 and assigned application Ser. No. 12/494,586, which, in turn, claims priority of European Patent Office Application No. 08012114.8 EP filed Jul. 4, 2008. All of the applications are incorporated by reference herein in its entirety.

FIELD OF INVENTION

The present invention relates to a method and a device for replacing a permanent magnet of a wind turbine generator.

BACKGROUND OF INVENTION

Forces between permanent magnets and forces between permanent magnets and other magnetizable materials have a short range but can nevertheless be very strong. The magnets of a permanent magnet generator may be attached to the rotor in a permanent manner, or they may be removable. Removable magnets offer advantages during assembly of the machine because they may be supported after the insertion of the rotor into the stator, thereby avoiding the need for strong centring support during rotor mounting. They may also be replaced in the field in case of damage or demagnetized magnets.

SUMMARY OF INVENTION

The handling of strong permanent magnets of a generator, particularly in confined spaces involves some serious risks. If a magnet during handling comes close to another magnet or some other magnetizable object, the strong magnetic forces can accelerate the parts to high velocities. If the parts then strike or clamp personnel or other equipment, serious injury or damage may result. The parts can also become so firmly attached to each other that they become impossible to separate from each other at the site. Similar problems can also occur during transport to and from the manufacturing location and the field location of the generator.

Therefore, it is a first objective of the present invention to provide an advantageous container for storing and transporting a permanent magnet. It is a second objective of the present invention to provide a method for replacing a permanent magnet from a first position to a second position. A third objective of the present invention is to provide a device for replacing a permanent magnet from a first position to a second position.

The first objective is solved by a container for storing and transporting a permanent magnet as claimed in the claims. The second objective is solved by a method for replacing a permanent magnet from a first position to a second position as claimed in the claims. The third objective is solved by a device for replacing a permanent magnet from a first position to a second position as claimed in the claims. The depending claims define further developments of the invention.

The inventive container for storing and transporting a permanent magnet comprises an open space for storing the permanent magnet. The space is surrounded by a shell. The shell has a thickness that provides that the permanent magnet can not come close enough to other magnetic material to exert significant force on it.

A typical rare-earth magnet has a remanence of the order of 1.2 T. The field measured on the outside of a rare-earth magnet that does not form part of a magnetic circuit is typically of the order of 250 mT. The recognised exposure limit for more than two hours daily exposure is 68 mT according to DIN VDE 0848, 1994. Hence, exposure limits could be exceeded when handling non-protected magnets.

The shell may especially have a thickness that provides that the magnetic force of the permanent magnet outside of the container is less than a factor 1/e, where e is Euler's number, compared with the magnetic force at the surface of the permanent magnet.

For example, the shell of the inventive container can have a thickness between 50 mm and 200 mm. By ensuring separation between the magnet and the outer wall of the container a thickness of the wall of 80 mm typically reduces the field to 40 mT.

Preferably the container and/or the shell may comprise non-magnetic material, preferably a material of low mass density. The low mass density is relevant because the wall thickness of the container must be large enough that the magnetic forces from a magnet inside the container are negligible outside the container. A high mass density would result in an impractically heavy container. For example, the container and/or the shell may comprise polystyrene foam. Polystyrene foam is a suitable material for an inventive container.

The container and/or the shell can especially have a density between 25 kg/m$^3$ to 1500 kg/m$^3$. Generally, the container and/or the shell may comprise any non-magnetic material, such as wood, polyurethane foam, fibreglass, expanded polythene, etc. These materials typically have a density range of 1500 kg/m$^3$ to 25 kg/m$^3$. For example, fibreglass made with ribs has a density of about 1500 kg/m$^3$ and expanded polythene has a density of about 25 kg/m$^3$.

Moreover, the container may comprise two openings which are located opposite to each other in a longitudinal direction. This means that the container is open at both ends so that the magnet can be removed from and inserted into the container in the longitudinal direction. Advantageously, the container can be longer than the permanent magnet in a longitudinal direction. Furthermore, the container may comprise stops of non-magnetic material to prevent the permanent magnet from sliding out of the container, especially during transport.

Furthermore, the container may comprise ribs to achieve the required thickness of the shell. In this case the container may be made of higher-density material where the combination of moderate weight and safety distance is achieved by the ribs or other geometrical means. Alternatively, the container may be made of thick low-density material as explained above.

The inventive method for replacing a permanent magnet from a first position to a second position comprises the steps of: placing the permanent magnet from the first position into an inventive container; transporting the container with the permanent magnet to the second position; removing the permanent magnet from the container, and placing the permanent magnet in the second position.

The first position and/or the second position may especially be located in a generator. For example, the first position and/or the second position can be located in a rotor. Furthermore, the first position may be located in a generator and the second position may be located outside of the generator. Alternatively, for example when a new or a repaired magnet is assembled in a generator, the first position may be located outside of the generator and the second position may be located in the generator.

Preferably the container may comprise at least one opening. At least one stop of non-magnetic material may be inserted into the opening before transporting the container to prevent the permanent magnet from sliding out of the container.

Furthermore, a support bracket can be firmly attached to the first position and/or to the second position. In this case the container can be placed on top of the bracket. For example, the support bracket may be firmly attached to a rotor at the end of the rotor and an inventive container with a permanent magnet can be placed on top of the bracket in such a way that the opening in the container is at the same height as the magnet. The container can be temporarily affixed to the bracket by bands of a suitable material.

During mounting and dismounting the support bracket may be mounted on the rotor. Alternatively, it may be mounted on the stationary part of the generator, for example on one of the end plates of the generator. In such arrangement the positioning relative to the rotor is slightly less controlled, but on the other hand the bracket does not need to be removed and re-mounted for each new magnet.

Generally, the permanent magnet can be pulled or pushed from the first position into the container and/or pulled or pushed from the container in the second position. For example, after removing the means for retaining the magnet to a rotor, the magnet can be pulled into the container with the help of a tool that has connecting means at the end which fits into a receiving end, for example an eye at the end of the magnet. The magnet may then be pulled into the container and at least one end stop may be inserted. The container with the magnet that has been extracted from the rotor can then be removed from the site. Next, a container with a new magnet may be placed on the support bracket. After removing the at least one stop the magnet can be pushed into its position in the rotor with the help of aforementioned tool. Means for retaining the magnet to the rotor can then be put back into place.

The inventive device for replacing a permanent magnet from a first position to a second position comprises an inventive container, at least one support bracket and at least one tool to push and/or pull the permanent magnet out of the container and/or into the container. The first position or the second position may be located in a generator. Furthermore, the support bracket can be mounted on the rotor or a stationary part of the generator. For example, the support bracket may be mounted on one of the end plates of the generator.

The tool can be mounted adjacent to the container and/or the tool can be support directly on the bracket. Alternatively the tool may be mounted on the opposite side of the generator. Moreover, two tools may be used. In this case the tools can be positioned such that on each side of the generator one tool is located. Both tools may be pushing tools, thereby avoiding the need for connecting means at the magnets. The tool may, for example, be a hydraulic cylinder.

The present invention provides a container for safely storing and transporting a permanent magnet, for example for a generator. It further provides tools for removing a container and installing it, for example in a generator, and inversely for removing a magnet, for example from a generator, and positioning it in a container. It further describes a method for using the above mentioned tools for replacing a magnet of a generator. The advantage resulting from the invention is that the strong magnets can be handled in a controlled and safe manner which avoids injury to personal and damage to equipment. This is accomplished by surrounding a magnet by a thick shell of non-magnetic material when the magnet is not installed in the generator. This thick shell of non-magnetic material ensures that the magnet can not come close enough to other magnetic materials to exert significant force on them.

By combining the transportation means with the mounting means the special advantage is achieved that the magnets will remain harmless during the entire process from packing at the magnet factory to the completion of the mounting in the generator. Thereby the need for special precautions, for example non-magnetic tools, etc. is avoided.

BRIEF DESCRIPTION OF THE DRAWINGS

Further features, properties and advantages of the present invention will be come clear from the following description of an embodiment in conjunction with the accompanying drawings.

DETAILED DESCRIPTION OF INVENTION

Figure 1:
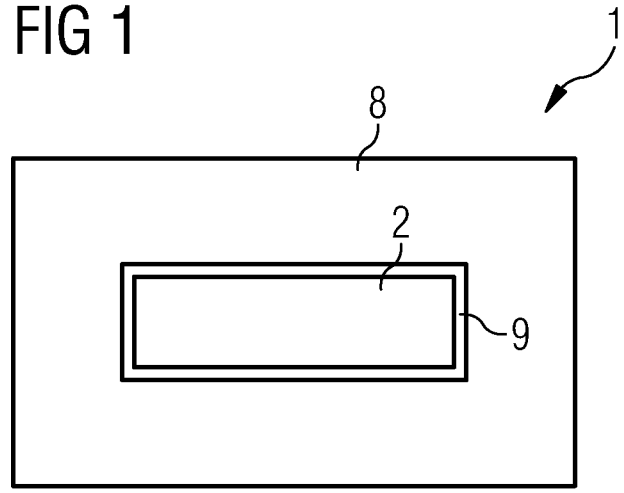
FIG. 1 schematically shows a container in a sectional view.

An embodiment of the present invention will now be described with reference to FIGS. 1, 2, and 3. FIG. 1 schematically shows a container 1 in a sectional view. An embodiment of a method 10 may include the container 1, that may have the shape of a long, thick-walled box with an open space 9 for a permanent magnet 2 in the middle. The open space 9 is surrounded by a shell 8 which has a thickness that provides that the permanent magnet 2 can not come close enough to other magnetic material to exert significant force on it. The shell 8 is made of polystyrene foam. At least one opening along the container may allow access to the open space 9.

The container 1 is open at both ends so that the magnet 2 can be removed from and can be inserted into the container 1 in the longitudinal direction 7. The container 1 is longer than the magnet 2 and stops of a non-magnetic material can be inserted into the openings at both ends to prevent the magnet 2 from sliding out of the container 1 during transport.

Figure 2:
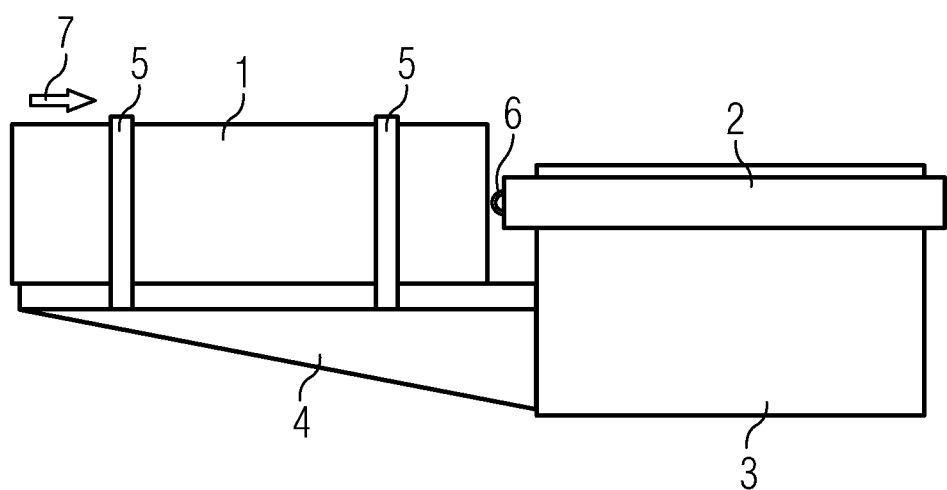
FIG. 2 schematically shows a rotor of a generator which is equipped with a device for replacing a permanent magnet.
Figure 3:
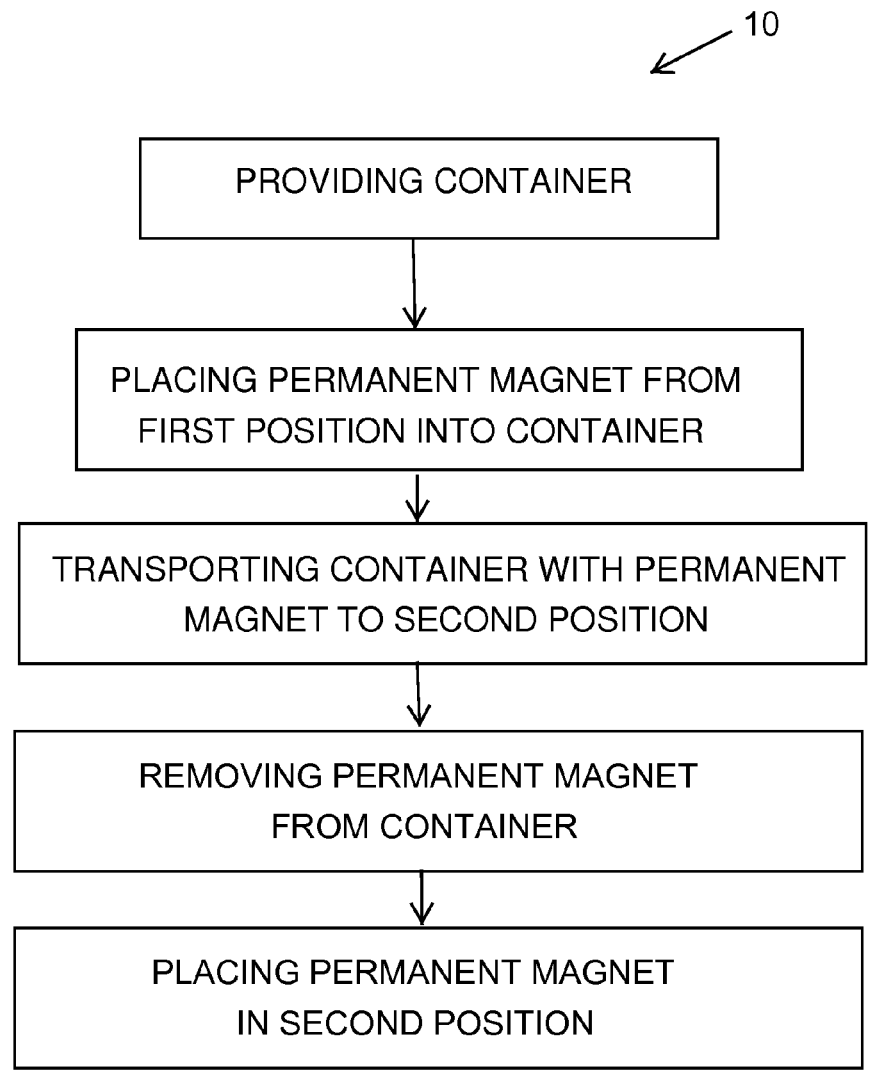
FIG. 3 is a block diagram of a method for replacing a permanent magnet of a generator of a wind turbine from a first position to a second position.

FIG. 2 schematically shows a part of a rotor 3 e.g. of a direct drive generator of a wind turbine, and a device for replacing a permanent magnet 2. The rotor 3 is rotated until the magnet 2 that is to be replaced is located in a suitable position, for example adjacent to a mounting opening in the generators structure. The rotor may physically be locked in this position. A support bracket 4 is firmly attached to the rotor 3 at the end of the rotor and the container 1 with a magnet inside is placed on top of the bracket 4 in such a way that the opening in the container 1 is at the same height as the magnet 2. The container 1 can be temporarily affixed to the bracket 4 by bands 5 of a suitable material. The longitudinal direction of the container 1 is indicated by an arrow 7 in FIG. 2.

After the means for retaining the magnet 2 to the rotor 3 have been removed, the magnet 2 is pulled into the container 1 with the help of a tool, which is not shown in FIG. 2, that has connecting means at the end which fits to a receiving end, for example an eye 6 at the end of the magnet 2. The magnet is pulled into the container and stops are inserted. The container 1 with the magnet 2 that has been extracted from the rotor 3 is then removed from the site. Next a container 1 with a new magnet is placed on the support bracket 4 and the stops at both ends of the container 1 are removed. The magnet 2 is then pushed into its position in the rotor 3 with the help of the aforementioned tool, and the means for retaining the magnet 2 to the rotor 3 are put back into place. In this manner preferably a permanent magnet of a direct drive generator of a wind turbine is able to be mounted, replaced and/or demounted.

During replacing the magnet 2 the support bracket 4 can also be mounted to a stationary part of the generator, for example on one of the end plates of the generator. In such arrangement the positioning relative to the rotor is slightly less controlled, but on the other hand the bracket 4 does not need to be removed and re-mounted for each new magnet 2.

The tool used to push and pull the magnet 2 may be mounted adjacent to the container 1, and it may be supported directly on the support bracket 4. It may, for example, be a hydraulic cylinder. Alternatively, it may be mounted on the opposite side of the generator. Two tools may be used, one on each side, both pushing, thereby avoiding the need for connecting means at the magnet 2.

The container 1 is made of thick low-density material, for example of polystyrene foam. Alternatively, it may be made of a higher-density material where the combination of moderate weight and safety distance is achieved by ribs or other geometrical means.

The invention claimed is:

1. A method for replacing a permanent magnet of a generator of a wind turbine from a first position to a second position, the method comprising:
    providing a container comprising a shell and two openings through the shell, the two openings defining an open space for storing the permanent magnet, the open space being surrounded by the shell, the two openings located opposite to each other in a longitudinal direction, and the shell having a thickness that provides that the permanent magnet does not come close enough to other magnetic material to exert significant force on it;
    attaching firmly a support bracket to the first position;
    placing the container on top of the bracket;
    pulling the permanent magnet from the first position into the container, wherein the two openings of the container are at the same level as the permanent magnet;
    transporting the container with the permanent magnet to the second position;
    pushing the permanent magnet from the container; and
    placing the permanent magnet in the second position.

2. The method as claimed in claim 1, further comprising:
    attaching firmly a support bracket to the second position; and
    placing the container on top of the bracket.

3. The method as claimed in claim 1, further comprising:
    pulling the permanent magnet from the first position into the container; and pushing the permanent magnet from the container in the second position.

4. The method as claimed in claim 1, comprising providing a thickness to the shell that provides that the magnetic force of the permanent magnet outside of the container is less than a factor of 1/e compared with the magnetic force at the surface of the permanent magnet.

5. The method as claimed in claim 1, wherein the container comprises non-magnetic material.

6. The method as claimed in claim 5, wherein the non-magnetic material is selected from the group consisting of polystyrene foam, wood, polyurethane foam, fibreglass, expanded polythene and a combination thereof.

7. The method as claimed in claim 1, comprising providing a thickness between 50 mm and 200 mm to the shell.

8. The method as claimed in claim 1, wherein the material of the container has a density between 25 kg/m$^3$ to 1500 kg/m$^3$.

* * * * *